(12) United States Patent
Fumagalli et al.

(10) Patent No.: US 10,633,189 B2
(45) Date of Patent: Apr. 28, 2020

(54) SORTING MACHINE

(71) Applicant: FIVES INTRALOGISTICS S.P.A. CON SOCIO UNICO, Lonate Pozzolo (Varese) (IT)

(72) Inventors: Matteo Fumagalli, Castano Primo (IT); Lorenzo Chierego, Varese (IT); Riccardo Macchi, Samarate (IT)

(73) Assignee: FIVES INTRALOGISTICS S.P.A. CON SOCIO UNICO, Lonate Pozzolo (IT)

( * ) Notice: Subject to any disclaimer, the term of this patent is extended or adjusted under 35 U.S.C. 154(b) by 0 days.

(21) Appl. No.: 16/222,537

(22) Filed: Dec. 17, 2018

(65) Prior Publication Data

US 2019/0185272 A1 Jun. 20, 2019

(30) Foreign Application Priority Data

Dec. 19, 2017 (IT) .................. 102017000146289

(51) Int. Cl.
*B65G 43/00* (2006.01)
*B65G 17/34* (2006.01)
*B65G 47/96* (2006.01)
*B07C 5/36* (2006.01)

(52) U.S. Cl.
CPC ............ *B65G 17/345* (2013.01); *B07C 5/36* (2013.01); *B65G 43/00* (2013.01); *B65G 47/96* (2013.01); *B65G 2203/0283* (2013.01); *B65G 2207/18* (2013.01)

(58) Field of Classification Search
CPC .............................. B65G 17/345; B65G 43/00

USPC ............... 198/350, 358, 370.01, 370.06
See application file for complete search history.

(56) References Cited

U.S. PATENT DOCUMENTS

| 3,655,030 A | * | 4/1972 | Hardwig | ................ B65G 47/48 198/352 |
| 4,938,335 A | * | 7/1990 | Canziani | .............. B65G 17/345 198/370.06 |
| 5,460,257 A | * | 10/1995 | Yoshida | ................. B65G 37/02 198/358 |

(Continued)

FOREIGN PATENT DOCUMENTS

| EP | 0752381 A1 | 1/1997 |
| WO | 2004011351 A2 | 2/2004 |

*Primary Examiner* — Douglas A Hess
(74) *Attorney, Agent, or Firm* — Pearne & Gordon LLP

(57) ABSTRACT

Described is a sorting machine comprising: a plurality of carriages (2), each carriage (2) comprising a loading-unloading device (3) which can be selectively activated for loading-unloading an object (O) from the carriage (2) and an electronic unit (4) configured to receive and analyse a loading-unloading signal and actuate the loading-unloading device (3) as a function of an operating mode, selected from a plurality of operating modes and uniquely associated with the loading-unloading signal; a plurality of loading stations (9) and a plurality of unloading stations (10) positioned along a sorting direction (X) comprising respective actuating units (11) configured to generate the loading-unloading signal.
Each carriage (2) comprises a permanent magnet (4c) which generates a stationary magnetic field and each actuating unit (11) comprises a Hall effect transducer (12) configured to detect the presence of the stationary magnetic field generated by the permanent magnet (4c).

11 Claims, 5 Drawing Sheets

(56) References Cited

U.S. PATENT DOCUMENTS

| | | | | |
|---|---|---|---|---|
| 5,588,520 | A * | 12/1996 | Affaticati | B61B 13/08 |
| | | | | 198/370.06 |
| 5,676,514 | A * | 10/1997 | Higman | B61B 13/04 |
| | | | | 198/349 |
| 5,803,230 | A | 9/1998 | Canziani et al. | |
| 6,370,447 | B1 * | 4/2002 | Miyazaki | B65G 43/10 |
| | | | | 198/349.8 |
| 6,662,931 | B2 * | 12/2003 | Bruun | B65G 37/02 |
| | | | | 198/617 |
| 6,814,216 | B2 * | 11/2004 | Veit | B07C 5/362 |
| | | | | 198/370.02 |
| 6,820,561 | B2 * | 11/2004 | Soldavini | B65G 17/345 |
| | | | | 104/88.03 |
| 7,017,730 | B2 * | 3/2006 | Mills | B65G 47/54 |
| | | | | 198/351 |
| 7,816,617 | B2 * | 10/2010 | Bennett | B07C 3/02 |
| | | | | 198/349 |
| 7,909,155 | B2 * | 3/2011 | Lupton | B65G 43/08 |
| | | | | 198/357 |
| 9,150,362 | B2 * | 10/2015 | Vegh | B65G 43/08 |
| 9,493,308 | B2 * | 11/2016 | Hoynash | B65G 17/345 |
| 9,701,487 | B2 * | 7/2017 | Unterseher | B65G 54/02 |
| 9,741,009 | B2 * | 8/2017 | Berghorn | G06Q 10/08 |
| 10,377,576 | B2 * | 8/2019 | Zak | B65G 17/345 |

* cited by examiner

SORTING MACHINE

The present invention relates to the technical field of sorting systems.

More specifically, this invention relates to a sorting machine.

The invention is particularly suitable for being implemented in the context of the prior art sorting systems of the "cross-belt" type, that is to say, systems wherein each carriage is equipped with a conveyor belt configured to move a body positioned above it, mainly in a direction perpendicular to the feed direction of the system, according to the various functions necessary during the loading step and unloading at the destination.

In more detail, the sorting machines of the cross-belt type consist of a train of carriages which occupies and moves along a closed circuit alongside the loading stations, which are designed to load on the carriages the objects to be sorted, and the unloading stations, where the objects are unloaded and generally accumulated to make efficient the work of the operators, who carry out the operations relating to the distribution and delivery to destination of the material sorted in this way.

The carriages, in this particular type of sorting machine, are equipped with a conveyor belt which can be activated by an electric motor in the direction at right angles to the direction of motion of the machine for receiving and sorting the objects.

The purpose of the loading stations is to determine the trajectory of the object being loaded to synchronise it with the motion of the carriage of the sorting machine designed to receive it, in such a way that the object can be transferred on board with the correct time and speed.

Generally, the unloading stations, on the other hand, consist of collection and storage chutes, or roller storage conveyors: the storage function is necessary to render efficient the work of the operators who transfer the sorted packages into containers, carriages, or directly into delivery means, in the case of couriers.

The various types of commands for activation of the belt are produced by the control system of the sorting machine, which knows at any instant the position along the path of each of its carriages.

The control system of the sorting machine is equipped with a group of sensors which constitute its encoder, with which it measures the basic forward movements of the sorting machine along the path.

It is therefore evident how machines and systems of this type require high precision levels, in particular as regards the communication of information within the system, in such a way as to allow the correct synchronisation between the loading-unloading stations and the individual carriages, thus guaranteeing that the objects to be sorted are correctly loaded/unloaded by activating the conveyor belt of each carriage at the opportune moment. One aspect which is particularly critical is therefore being able to determine the correct positioning of the carriage relative to the loading-unloading station with which it must interact.

Controlling the alignment condition is very important because it guarantees the complete and certain transmission of the commands. However, the prior art control systems are not able to guarantee anywhere along the path a correct forecast of the actual positions of the individual carriages, since these may vary dynamically on account of a series of phenomena such as, for example, the thermal expansion of some components of the sorting machine or different tensioning conditions of the machine, equivalent to a chain, which can lead to different paths especially at bends.

In this context, the technical purpose which forms the basis of the invention is to provide a sorting machine which overcomes the above-mentioned drawbacks of the prior art.

More specifically, the aim of this invention is to provide a sorting machine which is able to allow monitoring and ensure, during the loading-unloading operations, the correct positioning of its components in order to guarantee optimum operation.

The technical purpose indicated and the aims specified are substantially achieved by a sorting machine comprising the technical features described in one or more of the accompanying claims.

The invention describes a sorting machine which comprises a plurality of carriages, each carriage comprising in turn a loading-unloading device which can be selectively activated for loading-unloading an object from the carriage and an electronic unit configured to receive and analyse a loading-unloading signal and actuate the loading-unloading device as a function of an operating mode, selected from a plurality of operating modes and uniquely associated with the loading-unloading signal received.

The sorting machine also comprises a plurality of loading stations and a plurality of unloading stations, positioned along a sorting direction "X", which comprise respective actuating units configured to generate the loading-unloading signal.

Each carriage comprises a permanent magnet which generates a stationary magnetic field and each actuating unit comprises a Hall effect transducer configured to detect the presence of the stationary magnetic field generated by the permanent magnet.

Further features and advantages of this invention are more apparent in the detailed description below, with reference to a preferred, non-limiting embodiment of a sorting machine as illustrated in the accompanying drawings, in which.

Figure 1:
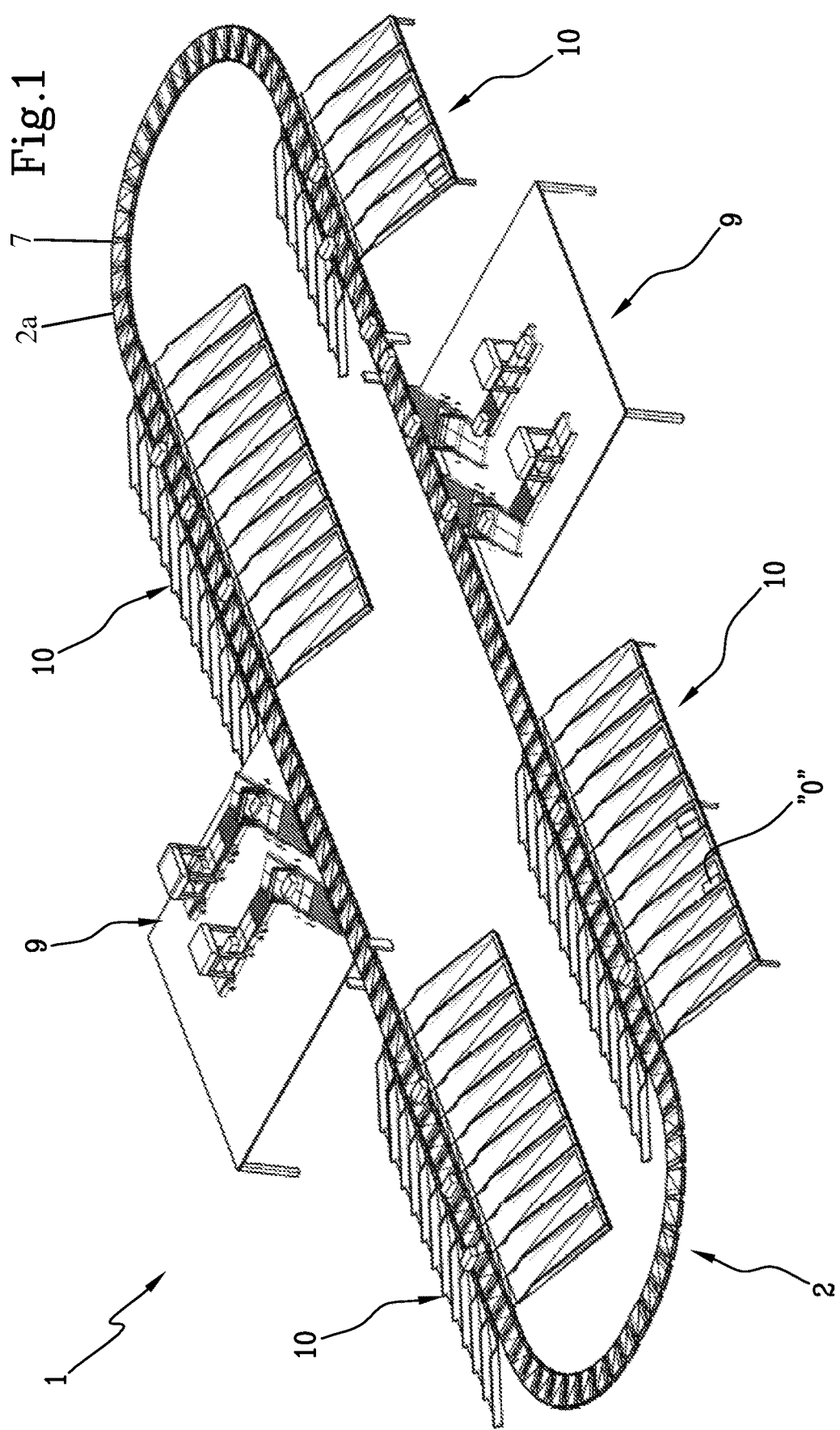
FIG. 1 shows a view of the sorting machine.

With reference to FIG. 1, the numeral 1 denotes in general a sorting machine which comprises a plurality of carriages 2 equipped with a loading-unloading device 3, which can be operated by a motor which is also mounted on the carriage 2, and an electronic unit 4.

Figure 2:
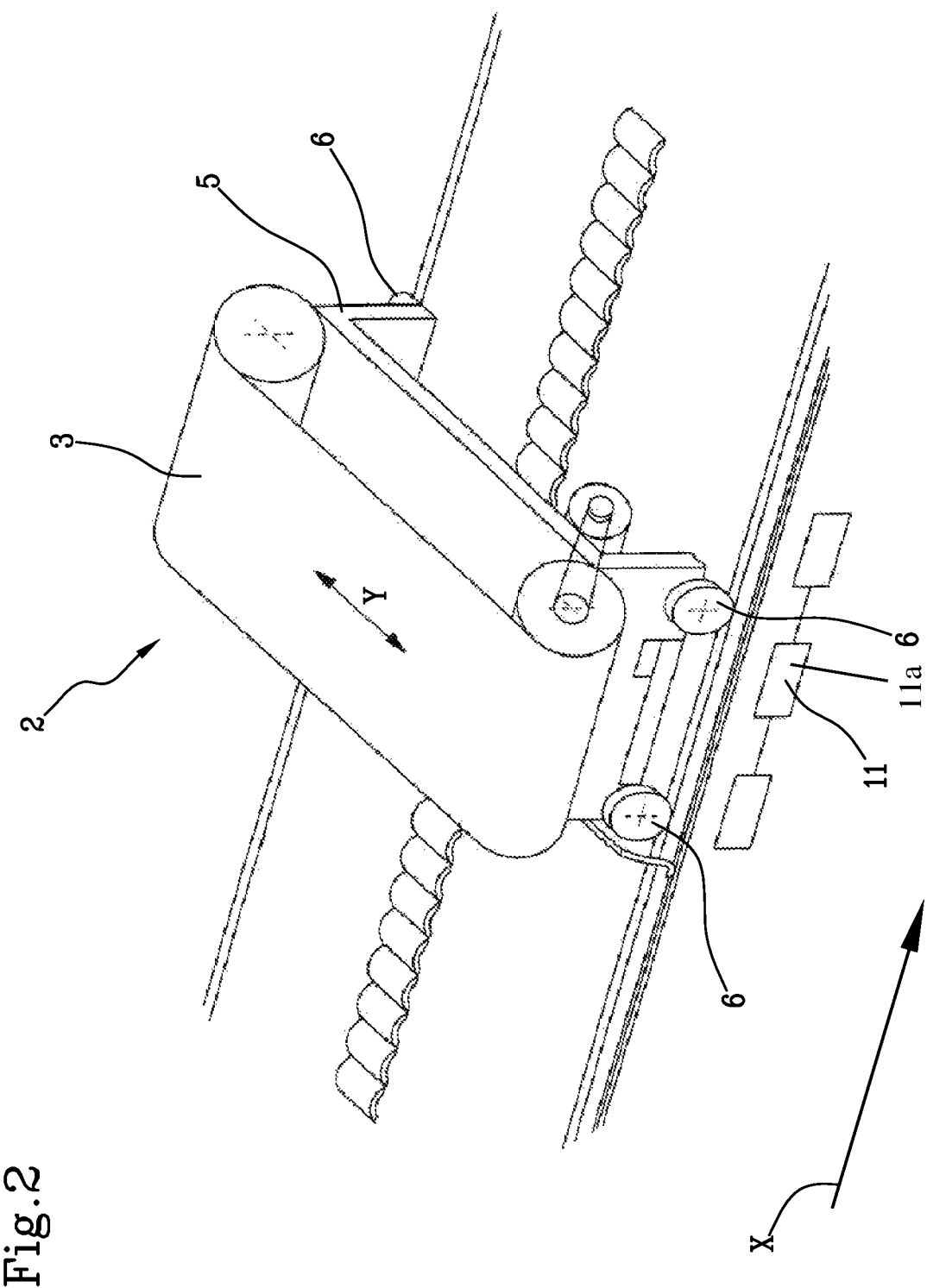
FIG. 2 is a detail of FIG. 1 which shows in detail a carriage of a sorting machine.

Each carriage 2, illustrated in detail in FIG. 2, also comprises a frame 5 equipped with wheels 6 and connected in a rotatable fashion with the adjacent carriages, in such a way as to form a continuous row positioned on a closed path 7 which defines a main sorting direction "X" along which is moved the continuous row of carriages 2.

In accordance with a preferred embodiment, the loading-unloading device 3 is made in the form of a conveyor belt located in a loading-unloading direction 'Y' perpendicular to the sorting direction 'X'.

Alternatively, the loading-unloading device 3 might be made, for example, by means of a plane which can be inclined.

The electronic unit 4 comprises an electronic card which is able to receive, process and if necessary generate a signal, in particular the loading-unloading signal.

Figure 3:
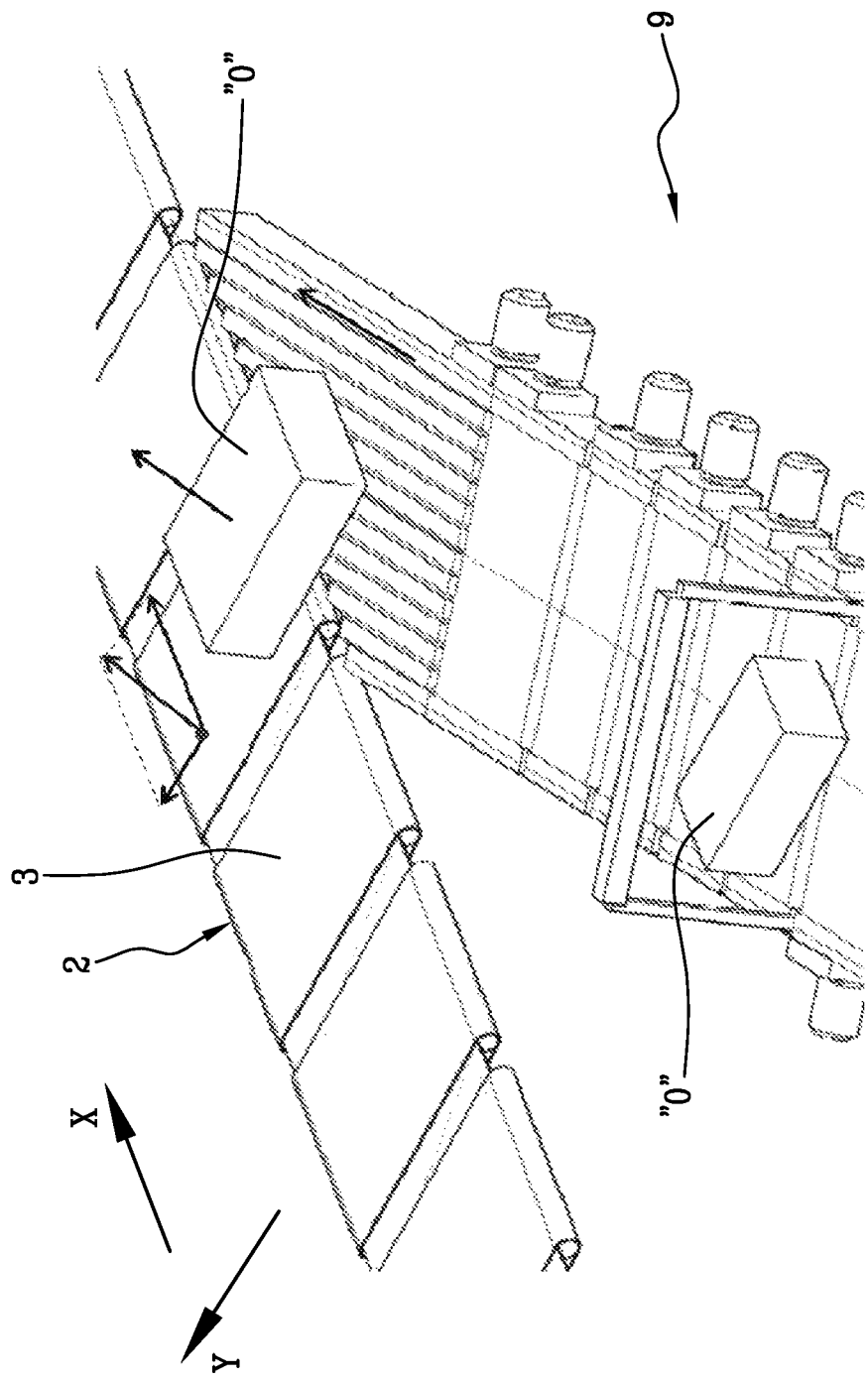
FIG. 3 is a detail of FIG. 1 which shows in detail a loading station of a sorting machine.
Figure 4:
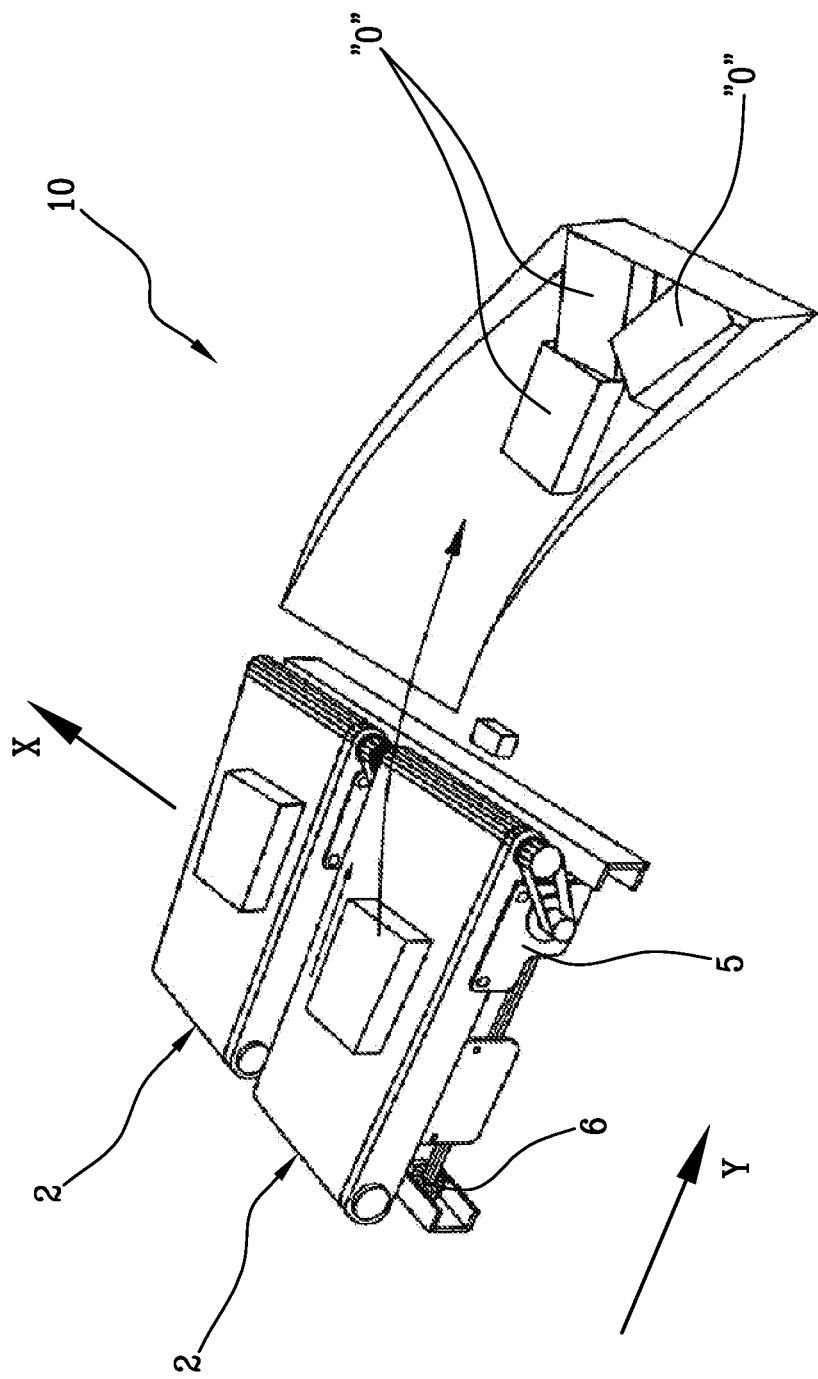
FIG. 4 is a detail of FIG. 1 which shows in detail an unloading station of a sorting machine.

The sorting machine 1 also comprises a plurality of loading stations 9 and a plurality of unloading stations 10, shown in detail in FIGS. 3-4 which are positioned along the sorting direction "X", in particular alongside the closed path 7 in such a way that the activation of loading-unloading device 3 of the carriage 2 allows an object "O" to be loaded on the carriage 2 from the loading stations 9 and to unload the same object "O" from the carriage to an unloading station 10.

Each station 9, 10 comprises an actuating unit 11 configured for generating the loading-unloading signal.

More specifically, the loading-unloading signal may be a digital signal comprising a string of at least one bit.

According to a preferred embodiment, the electronic unit 4 comprises a receiving element consists of windings 4a formed on a printed circuit, preferably of a length slightly less than the size of the carriage 2 along the sorting direction "X", in particular with a length of between 45% and 55% of the size of the carriage 2 along the sorting direction "X" and an electronic card 4b which is able to receive, process and if necessary generate an digital signal 20.

More specifically, each trolley 2 may have a length of between 700 mm and 900 mm, preferably each carriage 2 has a length of 800 mm and the windings 4a have a maximum length of between 350 mm and 400 mm, preferably 380 mm.

Again according to this embodiment, the actuating unit 11 of each station 9, 10 comprises an inductor 11a designed to generate a magnetic field with a variable frequency, preferably between 3 kHz and 55 kHz.

More specifically, the inductors are configured to generate a first magnetic field with a frequency of between 3 kHz and 8 kHz, preferably 5 kHz, and a second magnetic field with a frequency of between 47 kHz and 53 kHz, preferably 50 kHz.

In accordance with the Faraday law for magnetic induction, the electromotive force induced by a magnetic field in a closed line is equal to the opposite of the variation per unit time of the magnetic flux of the field through the surface delimited by the closed line.

When the inductor 11a modulates the frequency of the magnetic field generated, passing from one value to the other, an electrical signal is generated in the antenna of the electronic unit 4, which varies with the same frequency modulation of the field and is read, interpreted and actuated by the electronic card.

In order to guarantee the correct positioning of the carriages 2 relative to the loading stations 9 and the unloading stations 10 at the moment the transmission of the loading-unloading signal starts, the electronic unit 4 further comprises a permanent magnet 4c which generates a stationary magnetic field, thereby not interfering with the normal transmission of the loading-unloading signal which is based on frequency modulation of the intensity of the magnetic field, and each station 9, 10 comprises a Hall effect transducer 12.

A Hall effect transducer 12 is a sensor which varies its output voltage in response to the presence/vicinity of a magnetic field.

In a Hall effect transducer 12 a current is made to flow in a conducting material; in the presence of a magnetic field the electrons are deflected in a direction perpendicular to the flow of current, consequently generating a difference of potential in the same direction.

Unlike inductive sensors, which are usually made by means of windings of wire made of conductive material, which are only able to detect the presence of modulated frequency fields, Hall effect transducers 12 have the advantage of being able to also detect static magnetic fields, such as that generated by a permanent magnet 4c.

When a beam of charged particles passes through a magnetic field, the latter interacts with the beam deviating it, thus generating a charge distribution which may be such as originate a difference of potential, known as the Hall voltage, in a direction different to that of normal flowing of the beam of the particles.

Figure 5:
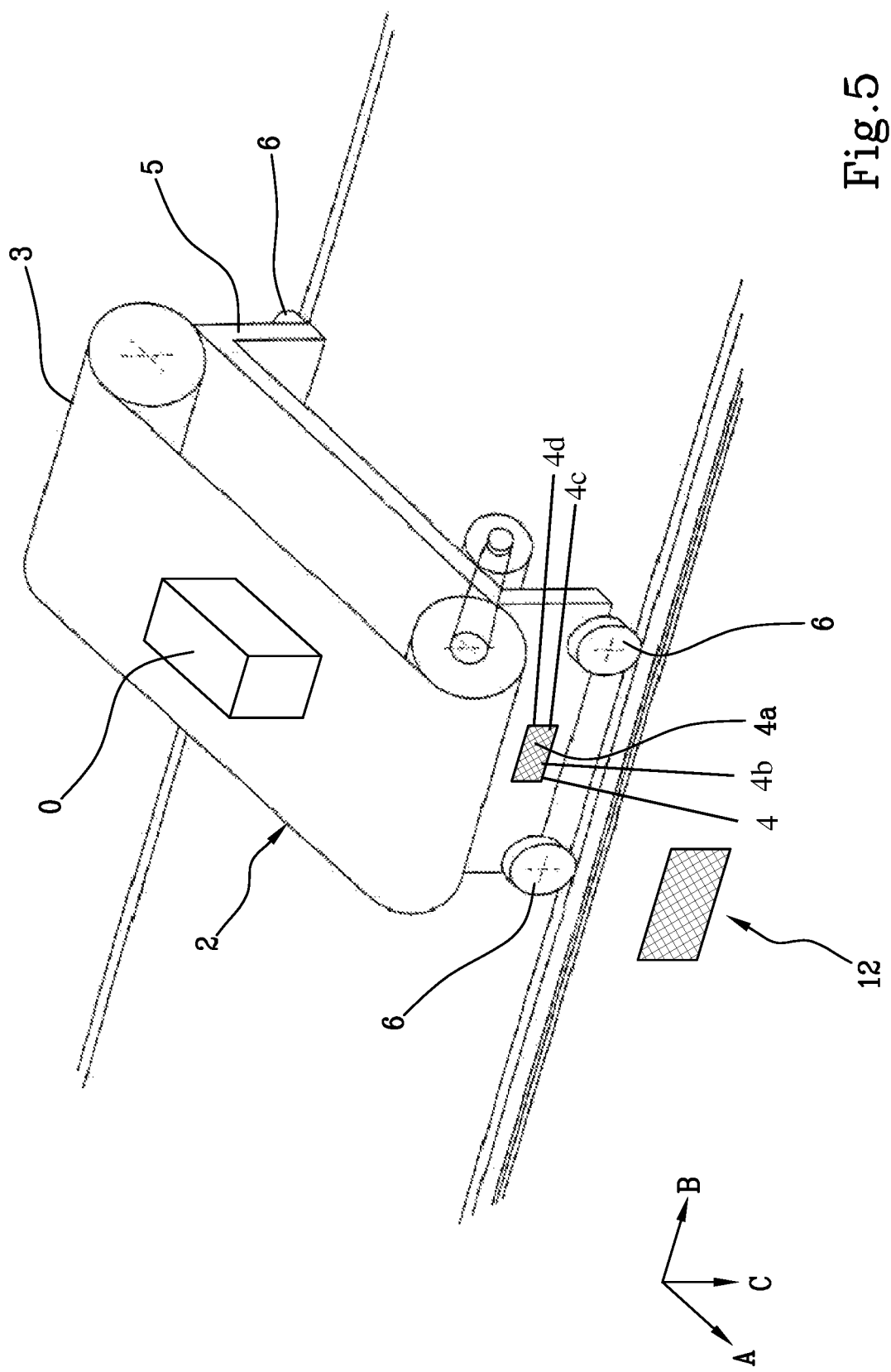
FIG. 5 shows a detail of the sorting machine according to the invention.

More specifically, as shown by way of example in FIG. 5, when a conducting material affected by a flow of current is placed in the presence of a stationary magnetic field having flux lines positioned along a direction "A", perpendicular to the flow direction "B" of the electrons, these are deflected, thus generating a difference in potential in a direction "C" perpendicular to both in accordance with the well known right-hand rule.

The Hall effect transducer 12 may operate both as an analogue transducer and as a switch.

In the first case, knowing the intensity of the stationary magnetic field generated by the permanent magnets, it is possible to calculate the distance from the Hall effect transducer 12 as a function of the Hall voltage generated in it.

In the second case the Hall effect transducer 12 is configured to activate/deactivate a device depending on whether or not the presence of a magnetic field is detected.

In accordance with what is described above and according to a preferred embodiment, each actuating unit is configured to start the transmission of the loading-unloading signal when the Hall effect transducer 12 detects the magnetic field generated by the permanent magnet 4c of the carriage 2 to which the loading-unloading signal is directed.

More in detail, each actuating unit 11 is configured for transmitting the loading-unloading signal when the Hall effect transducer 12 detects the maximum intensity of the magnetic field generated by the permanent magnet 4c of the carriage 2 to which the loading-unloading signal is directed; in other words, this indicates that the distance between the Hall effect transducer 12 and the permanent magnet 4c is at its minimum.

Alternatively, each actuating unit 11 may be configured to wait a waiting time, included, for example, between 0 seconds and 1 second, from when the Hall effect transducer 12 detects the magnetic field generated by the permanent magnet 4c of the carriage 2 to which the loading-unloading signal is directed before starting the transmission.

In order to be able to guarantee the correct operation of the sorting machine 1 and efficiency of transmitting the loading-unloading signal, each Hall effect transducer 12 has a nominal radius of between 30 mm and 40 mm, more preferably equal to 20 mm.

The term nominal radius refers to the maximum distance below which the Hall effect transducer 12 is able to detect in a certain manner the presence of a magnetic field.

More specifically, in order to guarantee the correct synchronisation between the detection of the presence of the carriage 2 by the Hall effect transducer 12 and the start of the transmission of the signal, the permanent magnet 4c is preferably positioned in a front portion of the carriage 2.

In the case of the particular embodiment wherein the electronic unit 4 comprises a receiving element consisting of windings 4a formed on a printed circuit, the permanent magnet 4c is preferably positioned at an end of the winding 4a facing towards the front end of the carriage 2 relative to its feed direction the along a sorting direction "X".

In order to further optimise the process of distinction and identification of the carriages 2 in such a way as to allow the correct transmission of the loading-unloading signal to the carriage 2, one of them, defined as the first carriage 2a, may comprise a main permanent magnet 4d which generates a stationary magnetic field of intensity different from the intensity of the stationary magnetic field generated by the permanent magnet 4c of each other carriage 2. In order to obtain this effect, the main permanent magnet 4d is made in such a way as to generate a stationary magnetic field which is different relative to each others; it is possible, for example, to vary the shape, the size or the material with which it is made.

Advantageously, the sorting machine 1 according to the invention makes it possible to overcome the above-mentioned problems of the prior art.

In effect, the installation on each carriage 2 of a permanent magnet 4c coupled with the application of a Hall effect transducer 12 on each station 9, 10 allows monitoring in real time and in an extremely accurate manner the arrangement of the carriages 2 with respect to the stations, in such a way as to be able to automatically guarantee the selection of the best moment to start transmission of the loading-unloading signal, thus avoiding transmission errors or failures which can result in malfunctioning of the system.

This solution is also particularly efficient and high performing, since it does not require any contact between carriages 2 and stations 9, 10, thereby substantially reducing the constructional and installation complexity of the sorting machine 1.

The invention claimed is:

1. A sorting machine comprising:
a plurality of carriages (2), each carriage (2) comprising a loading-unloading device (3) which can be selectively activated for loading-unloading an object (O) from the carriage (2) and an electronic unit (4) configured to receive and analyse a loading-unloading signal and actuate the loading-unloading device (3) as a function of an operating mode, selected from a plurality of operating modes and uniquely associated with the loading-unloading signal;
a plurality of loading stations (9) and a plurality of unloading stations (10) positioned along a sorting direction (X) comprising respective actuating units (11) configured to generate the loading-unloading signal;
characterised in that each carriage (2) comprises a permanent magnet (4c) which generates a stationary magnetic field and each actuating unit (11) comprises a Hall effect transducer (12) configured to detect the presence of the stationary magnetic field generated by the permanent magnet (4c), wherein the permanent magnet (4c) remains stationary with respect to the carriage (2) when the loading-unloading device (3) is activated for loading or unloading an object (O) to or from the carriage (2).

2. The machine according to claim 1, wherein the permanent magnet (4c) is positioned in a front portion of the carriage (2) relative to a feed direction of the carriage (2) along the sorting direction (X).

3. The sorting machine according to claim 2, wherein each actuating unit (11) of each loading station (9) or unloading station (10) comprises a respective inductor (11a) designed to generate a magnetic field with a variable frequency which is detected by the electronic unit (4) on a respective carriage (2).

4. The sorting machine according to claim 1, wherein each actuating unit (11) is configured for transmitting the loading-unloading signal when the Hall effect transducer (12) detects the magnetic field generated by the permanent magnet (4c) of the carriage (2) to which the load-unloading signal is directed.

5. The sorting machine according to claim 1, wherein each actuating unit (11) is configured for transmitting the loading-unloading signal when the Hall effect transducer (12) detects the maximum intensity of the magnetic field generated by the permanent magnet (4c) of the carriage (2) to which the loading-unloading signal is directed, that is, when the distance between the Hall effect transducer (12) and the permanent magnet (4c) is at its minimum.

6. The sorting machine according to claim 1, wherein each actuating unit (11) is configured for transmitting the loading-unloading signal after a waiting time of between 0 seconds and 1 second from when the Hall effect transducer (12) detects the magnetic field generated by the permanent magnet (4c) of the carriage (2) to which the loading-unloading signal is directed.

7. The sorting machine according to claim 1, wherein each Hall effect transducer (12) has a nominal radius of between 30 mm and 40 mm.

8. The sorting machine according to claim 1, wherein a single carriage (2) of the plurality of carriages (2), defined as the first carriage (2a), comprises a main permanent magnet (4d) which generates a stationary magnetic field of intensity different to the intensity of the magnetic field generated by the permanent magnet (4c) of each other carriage (2).

9. The sorting machine according to claim 8, wherein the main permanent magnet (4d) is made with at least one feature which is different from each other permanent magnet (4c), the at least one feature being selected among: shape of the main permanent magnet (4d), size of the main permanent magnet (4d), material from which the main permanent magnet (4d) is made.

10. The sorting machine according to claim 1, wherein the loading-unloading signal is a digital signal.

11. The sorting machine according to claim 10, wherein the digital signal comprises a string of at least one bit.

* * * * *